United States Patent [19]

Ivanov et al.

[11] 4,397,367
[45] Aug. 9, 1983

[54] LIFT AND PROPULSION UNIT OF AIR-CUSHION TRANSPORT VEHICLE

[76] Inventors: Sergei K. Ivanov, ulitsa Artema, 102-b, kv. 44; Viktor E. Dudkin, ulitsa Avtotransportnikov, 1, kv. 72; Iosif A. Raskin, ulitsa Universitetskaya, 34, kv. 16; Valery P. Peredery, prospekt Dzerzhinskogo, 6, kv. 88, all of Donetsk; Jury M. Mokhov, ulitsa Zheleznovodskaya, 46, kv. 32, Leningrad; Vladimir K. Dyachenko, Sredny prospekt, 58/36, kv. 10, Leningrad; Evgenia G. Finkelshtein, naberezhnaya Chernoi rechki, 61, kv. 77, Leningrad; Igor A. Martynov, ulitsa Malaya Gruzinskaya, 41, kv. 115, Moscow; Alexandr S. Kudryavtsev, Begovoi proezd, 97, kv. 5, Moscow; Valery V. Protsenko, Schelkovskoe shosse, 89, kv. 490, Moscow; Gennady G. Filipchenko, Kashtanovaya alleya, 2, kv. 248, Leningrad, all of U.S.S.R.

[21] Appl. No.: 265,584

[22] Filed: May 20, 1981

[51] Int. Cl.³ .............................................. B60V 1/14
[52] U.S. Cl. .................................. 180/117; 114/67 A; 180/120
[58] Field of Search ...................... 180/116, 117, 120; 114/67 A; 60/230

[56] References Cited

U.S. PATENT DOCUMENTS 3,463,263  8/1969  Winter .................................. 180/117
3,587,771  6/1971  Faure .................................. 180/117
3,777,842 12/1973  Laufman ............................. 180/117
3,799,446  3/1974  Rado .................................. 180/117
4,067,094  1/1978  Ittner ................................. 60/230

FOREIGN PATENT DOCUMENTS 1227044  3/1971  United Kingdom .................. 60/230
1306687  2/1973  United Kingdom .

OTHER PUBLICATIONS

"Air Cushion Vehicles", vol. 7, No. 45, Mar. 1966, pp. 33-39.

Primary Examiner—David M. Mitchell
Assistant Examiner—Donn McGiehan
Attorney, Agent, or Firm—Burgess, Ryan & Wayne

[57] ABSTRACT

There is proposed a lift and propulsion unit for an air-cushion transport vehicle, with an axial fan installed at the entrance portion of an annular duct and at the exit of said annular duct is disposed a thrust nozzle comprising a reversing-and-steering device with independently rotatable rudder blades and reversing vanes installed in the walls of said thrust nozzle after said axial fan; said rudder blades close the exit section of said thrust nozzle during reversal of the thrust and make with each other an obtuse angle whose apex is directed toward said axial fan, and the side walls of said reversing-and-steering device are made in the form of a polyhedral vaned surface each facet of which is comprised by a cascade of bow-shaped reversing vanes.

The invention may be used in the development of air-cushion transport vehicles, self-propelled transport platforms and apparatus in which the translatory motion is effected due to a reactive thrust provided by the ejected air stream.

6 Claims, 5 Drawing Figures

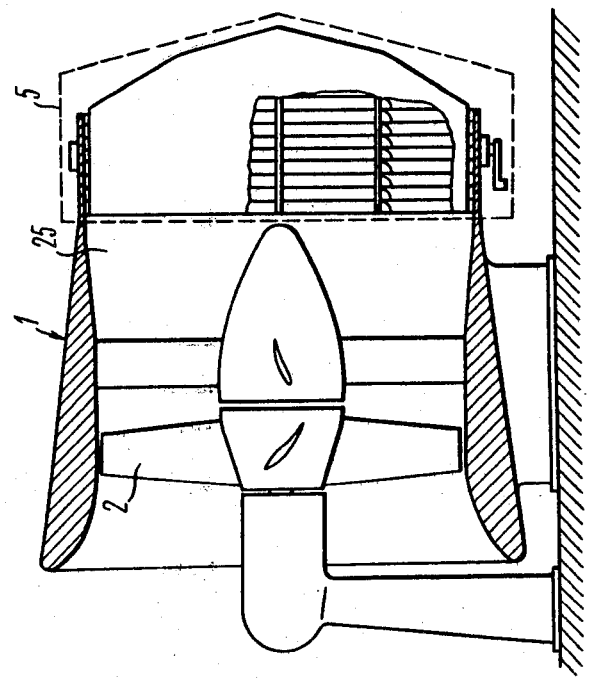
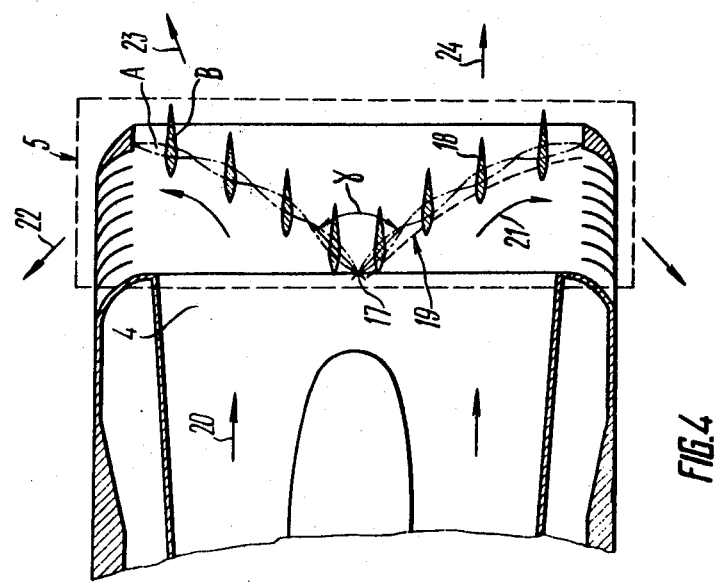

LIFT AND PROPULSION UNIT OF AIR-CUSHION TRANSPORT VEHICLE

TECHNICAL FIELD

The present invention relates to air-cushion transport vehicles and, more particularly, to lift and propulsion units for an air-cushion transport vehicle.

INDUSTRIAL APPLICABILITY

The invention may be used in the development of air-cushion transport vehicles, self-propelled transport platforms and apparatus, wherein for supporting them above the bearing surface the use is made of a pressurized air delivered into a cushion, and the translatory motion is effected by reactive thrust provided by an ejected air stream. In such units the pressurized air is delivered by fans. Directional control of the reactive thust is effected by the use of a reversing-and-steering device installed at the exit of a reactive thrust nozzle or air passages.

BACKGROUND ART

In many countries air-cushion transport vehicles find various applications in different fields of use.

Factors which restrain further application of such vehicles are the following: large overall sizes and weight a device for controlling the reactive thrust and also the complicated construction of mechanisms for effecting the turning of flaps and blades, used in these devices. The overall size and mass weight of the reversing-and-steering devices are mainly determined by the flow capacity of passages which direct the air flow during production of a forward and reverse thrust. Changing the direction of a reactive air stream is accomplished by a system of rotatable and guide blades installed in the exit sections of nozzles or passages.

Known in the art are lift and propulsion units for air-cushion craft, comprising reversing-and-steering devices (cf., for example, a magazine "Air-Cushion Vehicles", Vol. 7, No. 45, March 1966, pp. 33 through 39).

The known lift and propulsion units comprise a centrifugal fan installed in a spiral casing. The spiral casing is provided with a passage delivering air to a reactive thrust nozzle having rotatable rudder blades installed at the exit thereof. For reversing, use is made of a scoop-like flap which closes the passage delivering air to the reactive thrust nozzle and directs the air during reversal toward the craft bow.

Such a reversing device has a substantial mass, requires a special mechanism for turning the flap and generally fails to ensure directional control of the reversed reactive thrust.

Known in the prior art is a lift and propulsion unit for an air-cushion transport vehicle comprising an axial fan disposed in an annular duct (cf., for example, British Pat. No. 1,306,687, Cl.60 V 1/00, issued on Feb. 14, 1973). This unit also comprises a reversing-and-steering device consisting of articulated rotatable louver blades which in combination with flaps close the exit of the air from the annular duct, to provide the reversal of the air stream. The louvers and flaps are controlled from the cabin of a transport vehicle.

Such a reversing device should have a substantial axial size to allow accommodation, in side walls of the annular duct, of individually rotatable louver blades and to permit arrangement, at the exit of the annular duct, of rotatable flaps serving to close the thrust passage with the purpose of obtaining the reversal of the air stream. The device also requires a special mechanism for individually turning the louver blades and the flaps.

On the whole, such a unit is of a substantial axial size and has an additional mechanism for individually turning the louver blades. Therefore, such a unit increases the overall size, complicates the construction and hampers the control of an air-cushion transport vehicle.

SUMMARY OF THE INVENTION

It is an object of the present invention to improve the controllability of an air-cushion transport vehicle.

It is another object of the invention to simplify the construction and minimize the axial size of a reversing-and-steering device of a lift and propulsion unit of an air-cushion transport vehicle.

These objects are attained by a lift and propulsion unit of an air-cushion, transport vehicle, comprising an annular duct provided at its entrance portion with an axial fan and at its exit, with a thrust nozzle having a reversing-and-steering device with independently rotatable rudder blades and reversing vanes installed in side walls of the thrust nozzle after the axial fan. According to the invention the side walls of the reversing-and-steering device are made in the form of a polyhedral vaned surface, each facet of which comprises a cascade of bow-shaped reversing vanes, and the rudder blades close the exit section of the thrust nozzle during reversal of the thrust and make with each other an obtuse angle whose apex is directed toward the axial fan.

Leading edges of the bow-shaped reversing vanes may suitably be directed toward the rudder blades and kept perpendicular to a longitudinal axis of the fan, and trailing edges of the bow-shaped reversing vanes should be inclined at an acute angle to the side walls of the thrust nozzle and directed toward the entrance portion of the annular duct.

Such an arrangement of the bow-shaped reversing vanes makes it possible to install the latter almost along the entire perimeter in the facets of the nozzle side walls at the exit. This allows the axial length of the thrust nozzle portion provided with the bow-shaped reversing vanes, to be substantially reduced.

Besides, the cascades of the reversing vanes may be of the same standard size, and the number of facets on the side walls may be selected, in this case, depending on the diametral sizes and the perimeter of the thrust nozzle side walls.

The arrangement of the rudder blades when closing the exit section of the thrust nozzle during thrust reversal, at which time they make with each other an obtuse angle whose apex is directed toward the axial fan, makes it possible to turn and direct the air stream with minimum aerodynamic losses through the side walls of the reversing-and-steering device provided with the bow-shaped reversing vanes. This allows the amount and velocity of the reverse air stream to be increased with the result that the reverse thrust is augmented and the controllability of a transport vehicle is improved.

It is preferable that the rudder blades closing the exit section of the thrust nozzle be made up of two independently rotatable airfoils. Such an embodiment of the rudder blades is convenient for a small-size nozzle, in which case the airfoils are of small size which is advantageous from the standpoint of technology and construction.

It also will be appreciated that the rudder blades closing the exit section of the thrust nozzle during reversal, may comprise a plurality of independently rotatable airfoils forming, in the closed position, surfaces for directing the air flow to the reversing vanes.

In this case the to-be-closed section of a thrust nozzle may be of a substantial size, therefore from the standpoint of technology and construction, it will be advantageous instead of one broad airfoil to have a plurality of respectively narrower independently rotatable airfoils, with the total width thereof being approximately equal to the width of one broad airfoil.

Besides, a plurality of narrow airfoils may be installed inside the thrust nozzle so that at closing of the thrust nozzle the airfoils will form a smooth guiding curvilinear surface turning the air flow in reverse with small aerodynamic losses.

BRIEF DESCRIPTION OF THE DRAWINGS

To enable the invention to be fully understood the embodiments thereof will now be described with reference to the accompanying drawings, wherein:

FIG. 4 is a section taken on the line IV—IV of FIG. 1, illustrating an embodiment with a plurality of rudder blades, according to the invention;

FIG. 5 schematically illustrates a vertical section of a propulsion installation provided with a reversing-and-steering device.

BEST MODE FOR CARRYING OUT THE INVENTION

Figure 3:
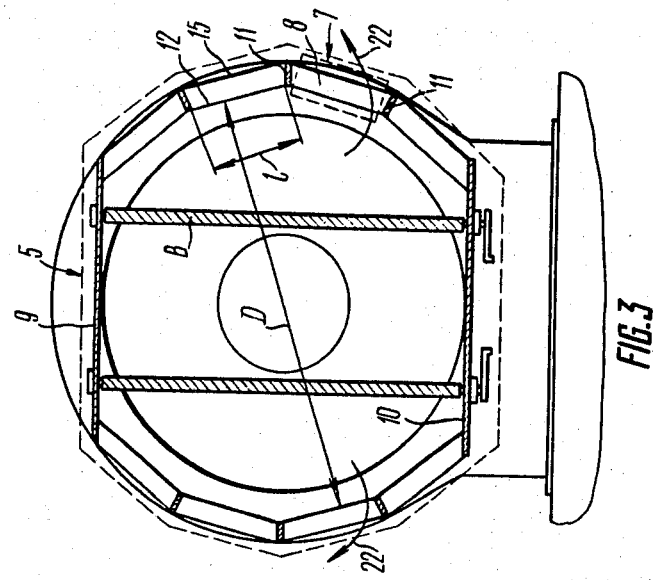
FIG. 3 is a section taken on the line III—III of FIG. 1.

A lift and propulsion unit of an air-cushion transport vehicle, according to the invention, comprises an annular duct 1 (FIG. 1) provided at its entrance portion with an axial fan having a fan wheel 2 rotated by a drive system 3. Disposed at the exit portion of the annular duct 1 is a thrust nozzle 4 incorporating a reversing-and-steering device 5 inside of which are installed independently rotatable vertical rudder blades made in the form of airfoils 6 (FIGS. 2, 3), and side walls of the reversing-and-steering device 5 are formed by cascades 7 of bow-shaped vanes 8 which are fixedly secured between plane-parallel walls 9 and 10 (FIG. 3) and are mating with one another through the medium of plates 11, thereby making up a polyhedral vaned surface of the side walls, through which air is ejected during reversal. In this case the number of facets of the side wall with the cascades 7 made up of the vanes 8 may be selected depending on a diametral size D between the cascades 7, with a preset constructional length $p$ of the vanes 8.

Figure 2:
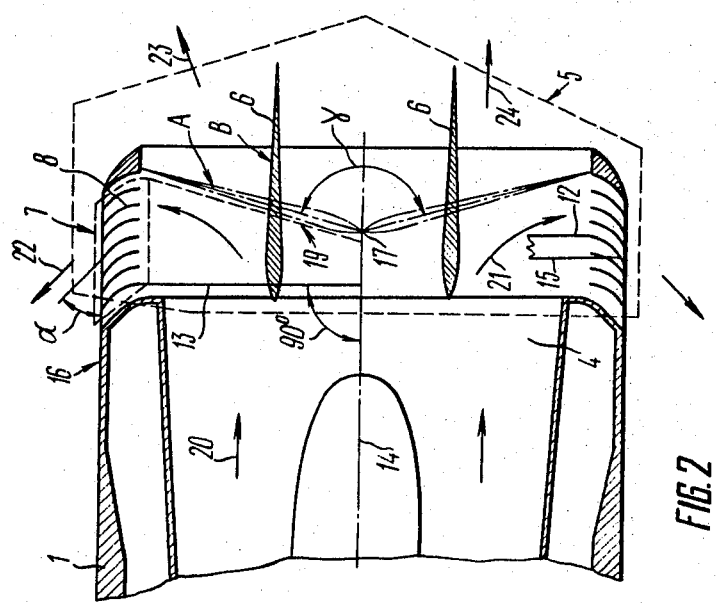
FIG. 2 is a section taken on the line II—II of FIG. 1.

The provision of the plane-parallel walls 9 and 10 makes it possible to ensure the sealing of tips of the airfoils 6 when the latter are turned to a closed position A (FIG. 2).

The constructional embodiment of the walls of the reversing-and-steering device permits use of almost the entire lateral surface of the thrust nozzle for ejection of the air flow during reversal. The construction increases the amount of reverse thrust and permits the axial length of the reversing-and-steering device to be shortened. In addition, it is useful from the standpoint of construction of the nozzle, to use only one standard cascade 7 (FIG. 3) comprising the simple vanes 8 which are comparatively small in size, have the length $p$ and are bow-shaped in cross-section. A series of nozzles of different diameters can be constructed by use of the standard cascade. The different size nozzles are built by setting up the required number of standard cascades in the side wall of the reversing-and-steering device.

To ensure the turning of air flow during reversal with minimum aerodynamic losses, each bow-shaped vane 8 by its leading edge 12 (FIGS. 2, 3), in an optimum variant, is turned toward the airfoils 6 and lies in a plane 13 (FIG. 2) perpendicular to a longitudinal axis 14 of the fan. This ensures a shock-free entry of the air flow to the vanes 8 during reversal.

Trailing edges 15 of the vanes 8 are inclined at an acute angle $\alpha$ to an external surface 16 of the annular duct 1 and directed toward the entrance portion thereof, due to which the air stream having passed during reversal through the cascade 7, flows toward the trailing edges 15, thereby producing the reverse reactive thrust. The airfoils 6 in the closed position A, i.e. at closing the exit section of the thrust nozzle 4 and during the thrust reversal, make with each other an obtuse angle $\gamma$. In this case, an apex 17 of the angle $\gamma$ made by the airfoils 6, is directed toward the fan wheel 2 of the axial fan. This creates favourable conditions for the flow of the air stream passing to the airfoils 6 when the reversing air stream is turned toward the bow-shaped vanes 8.

According to the invention, the rudder blades may also be made up of a plurality of independently rotatable airfoils 18 (FIG. 4) of reduced width when compared with the two airfoils 6 (FIG. 2), which on closing the exit section of the thrust nozzle 4 (FIG. 4) form, in the closed position A, a guiding surface 19 for ejection of the air stream during reversal of the reactive thrust.

The lift and propulsion installation of an air-cushion transport vehicle, with the reversing-and-steering device operates in the following way.

The drive system 3 (FIG. 1) rotates the fan wheel 2 of the axial fan due to which air is drawn into the annular duct 1 and passes in a direction 20 (FIGS. 1, 2) toward the thrust nozzle 4, flows past the airfoils 6 of the rudder blades turned to an open position B, and is ejected from the thrust nozzle 4 outside in the direction of the longitudinal axis 14, thereby producing the reactive thrust imparting the translatory motion to the transport vehicle.

When it is necessary to reverse the reactive thrust, the airfoils 6 or 18 of the rudder blades are turned to the closed position A (FIGS. 2 and 4). As a result, the air stream passes to the thrust nozzle 4 in the direction 20 and then flows along the guiding surface 19 in a direction 21, passes through the cascade 7 of the bow-shaped vanes 8, wherein the air stream is diverted toward the entrance of the annular duct and is ejected outside in a direction 22, thereby producing the reactive thrust for moving the transport vehicle in reverse.

For manuevering and turning the transport vehicle, one of the airfoils 6 (FIG. 2) of the rudder blades is set to an intermediate position between the positions A and B, due to which the air stream being thus turned in a direction 23 is ejected from that side to which the transport vehicle is to be turned, while the airfoil 6 located at the opposite side of the longitudinal axis 14 remains in the open position B and the air stream is ejected without any diversion in the direction 24. Such a position of the airfoils 6 sets up a moment of reactive forces from the air streams ejected in the directions 23 and 24 with the result that the transport vehicle is turned.

However, in a number of cases and particularly on air-cushion vehicles of high load-carrying capacity, use is made of individual, self-contained lift and propulsion units. In this case a self-contained propulsion unit may be provided with the reversing-and-steering device heretofore described.

A modified embodiment of the propulsion unit with the reversing-and-steering device of the present invention will now be considered as applied to this case.

In a self-contained propulsion unit of an air-cushion transport vehicle, the entire air stream delivered by the fan wheel 2 (FIG. 5) installed in the annular duct 1, flows into a thrust nozzle 25 and then passes through the reversing-and-steering device 5. Owing to the fact that the entire air stream passes through the thrust nozzle 25, the reactive thrust produced by the self-contained propulsion installation is increased.

Figure 1:
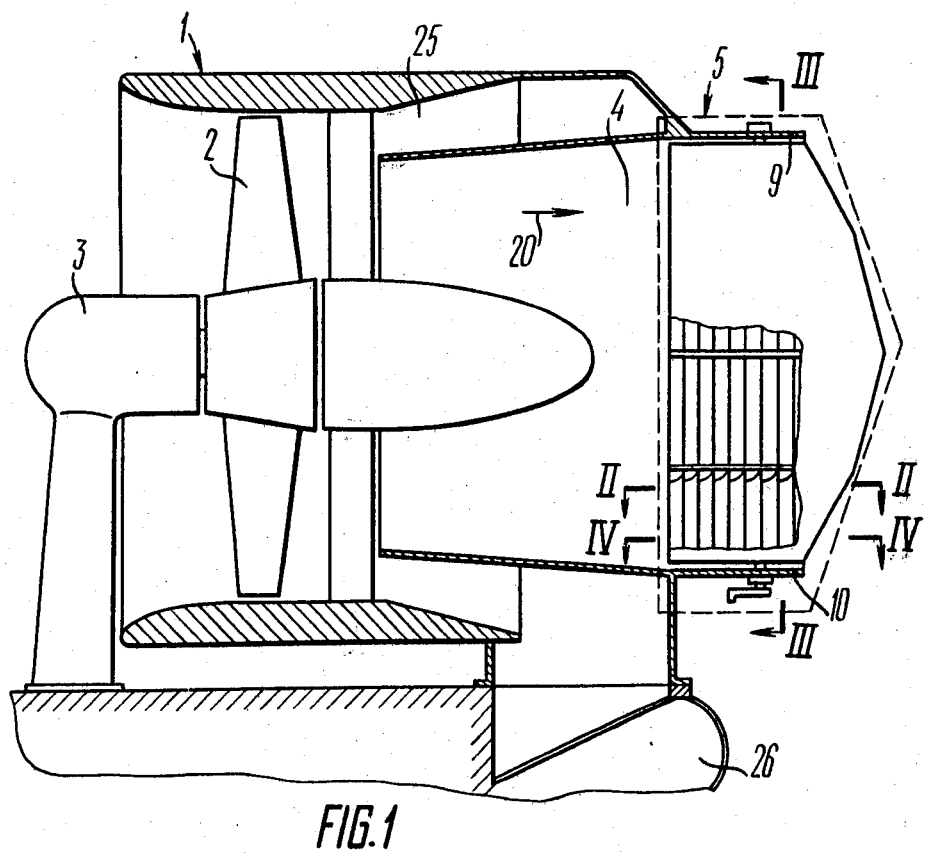
FIG. 1 schematically illustrates a vertical section of a lift and propulsion unit of an air-cushion transport vehicle, according to the invention.

In other respects related to the directional control and reversal of the reactive thrust, the self-contained propulsion installation unit with the reversing-and-steering device 5 will operate in the same way as the above described lift and propulsion unit of the air-cushion transport vehicle of FIG. 1.

Thus, the disclosed embodiments of the lift and propulsion unit of FIG. 1 and the propulsion unit of FIG. 5, comprising respectively the thrust nozzles 4 and 25 provided with the reversing-and-steering device 5, ensure the effective directional control of an air-cushion transport vehicle. The axial size of the reversing-and-steering device 5 may be minimized and the control thereof will be simplified. For effective all-round maneuverability and directional control, it is sufficient to provide only independent turning of the rudder airfoils 6 or 18 (FIG. 2, 4).

What is claimed is:

1. A lift and propulsion unit of an air-cushion transport vehicle, comprising: an annular duct; an axial fan, for conveying air through said annular duct, arranged at the entrance portion of said annular duct; a thrust nozzle arranged at the exit of said annular duct; said thrust nozzle having a reversing-and-steering device having side walls, which comprises; a plurality of independently rotatable rudder blades, and reversing vanes installed in the side walls of said reversing-and-steering device after said axial fan, said rudder blades closing the exit section of said thrust nozzle during reversal of the thrust by making with each other an obtuse angle whose apex is directed toward said axial fan to divert air to said reversing vanes, said side walls of said reversing-and-steering device comprising a polyhedral vaned surface, each facet of said polyhedral vaned surface comprising a cascade of bow-shaped reversing vanes.

2. A lift and propulsion unit of an air-cushion transport vehicle according to claim 1, in which leading edges of said bow-shaped reversing vanes are directed toward said rudder blades and kept perpendicular to the longitudinal axis of said thrust nozzle, and trailing edges thereof are inclined at an acute angle to said side walls of said thrust nozzle and directed toward the entrance portion of said annular duct.

3. A lift and propulsion unit of an air-cushion transport vehicle according to claim 1, in which said rudder blades comprise two streamlined airfoils.

4. A lift and propulsion unit of an air-cushion transport vehicle according to claim 2, in which said rudder blades comprise two streamlined airfoils.

5. A lift and propulsion unit of an air-cushion transport vehicle according to claim 1, in which said rudder blades comprise more than two streamlined airfoils making up, in the closed position, guiding surfaces which close the exit section of said thrust nozzle.

6. A lift and propulsion unit of an air-cushion transport vehicle according to claim 2, in which said rudder blades comprise more than two streamlined airfoils making up, in the closed position, guiding surfaces which close the exit section of said thrust nozzle.

* * * * *